US009125268B2

(12) United States Patent (10) Patent No.: US 9,125,268 B2
Nakano et al. (45) Date of Patent: Sep. 1, 2015

(54) POWER SUPPLY FOR LED ILLUMINATION

(71) Applicant: Sanken Electric Co., LTD., Niiza-shi, Saitama (JP)

(72) Inventors: Toshihiro Nakano, Niiza (JP); Kengo Kimura, Niiza (JP); Takayuki Yamashita, Niiza (JP); Yuji Sayama, Niiza (JP); Hiroaki Kiuchi, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 228 days.

(21) Appl. No.: 13/920,723

(22) Filed: Jun. 18, 2013

(65) Prior Publication Data

US 2013/0334968 A1    Dec. 19, 2013

(30) Foreign Application Priority Data

Jun. 19, 2012    (JP) .................................. 2012-138027

(51) Int. Cl.
*H05B 37/00*        (2006.01)
*H05B 33/08*        (2006.01)

(52) U.S. Cl.
CPC .......... *H05B 33/083* (2013.01); *H05B 33/0815* (2013.01); *Y02B 20/347* (2013.01)

(58) Field of Classification Search
None
See application file for complete search history.

(56) References Cited

U.S. PATENT DOCUMENTS

| 5,619,361 | A | 4/1997 | Sagesaka et al. | |
|---|---|---|---|---|
| 8,502,459 | B2 | 8/2013 | Son et al. | |
| 8,575,857 | B2* | 11/2013 | Sako et al. | 315/291 |
| 2010/0225235 | A1* | 9/2010 | Nagase | 315/130 |
| 2011/0266962 | A1 | 11/2011 | Son et al. | |
| 2012/0262068 | A1* | 10/2012 | Chi et al. | 315/122 |
| 2013/0038213 | A1* | 2/2013 | Son et al. | 315/122 |
| 2014/0152182 | A1* | 6/2014 | Yamamoto et al. | 315/122 |
| 2014/0159586 | A1* | 6/2014 | Kido | 315/151 |
| 2014/0197739 | A1* | 7/2014 | Lu | 315/122 |
| 2014/0232270 | A1* | 8/2014 | Kimura et al. | 315/122 |
| 2014/0246979 | A1* | 9/2014 | Zhang | 315/122 |
| 2014/0333520 | A1* | 11/2014 | Zhang et al. | 345/102 |
| 2014/0346955 | A1* | 11/2014 | Zhang | 315/122 |

FOREIGN PATENT DOCUMENTS

| JP | 06-291732 | | 10/1994 |
|---|---|---|---|
| JP | 2008-258428 | A | 10/2008 |
| KR | 101005199 | B1 | 12/2010 |
| KR | 20110120623 | A | 11/2011 |

* cited by examiner

*Primary Examiner* — Tuan T Lam

(74) *Attorney, Agent, or Firm* — Banner & Witcoff, Ltd.

(57) ABSTRACT

An LED illumination system includes: a load including an LED lamp; and a power supply device, the LED lamp configured to be physically mounted on and demounted from the power supply device, the power supply device comprising: a current feedback control unit; a first voltage comparison unit configured to determine whether the load is in a mounted state; a voltage feedback control unit configured to decrease the voltage of the power supply device to a safe voltage when demounting, and to increase the voltage of the power supply device to perform the constant current control when mounting; and a semiconductor switch element connected in series between the load and the detection resistor, wherein the mounted and demounted states of the load is detected by a voltage of a main electrode of a high potential side of the semiconductor switch element.

6 Claims, 7 Drawing Sheets

POWER SUPPLY FOR LED ILLUMINATION

CROSS-REFERENCE TO RELATED APPLICATION

This application claims priority from Japanese Patent Application No. 2012-138027 filed on Jun. 19, 2012, the entire subject matter of which is incorporated herein by reference.

TECHNICAL FIELD

This disclosure relates to a power supply device able to detect mounting and demounting of an LED lamp in an LED illumination apparatus.

BACKGROUND

Recently, an illumination apparatus using white LEDs have been commercialized as a replacement for existing fluorescent lamps in a field of illumination. The LED illumination apparatuses have a merit that a life span thereof is longer than the fluorescent lamps. Also, because mercury is used in the fluorescent lamps, the LED illumination apparatuses are favored in terms of environmental burden.

In white LED illumination apparatuses, LED lamps are typically driven by a step-down chopper type DC/DC converter or a fly-back type DC/DC converter. For the LED lamps, a plurality of LED elements are connected in series to each other, thereby constantly keeping an electric current flowing through the LED elements, reducing a brightness variation between each LED element, and also ensuring a light intensity required for illumination.

Further, in a case of LED lamps requiring a higher light intensity, a plurality of rows of LED elements, which are connected in series to each other as described above, are connected in parallel to each other to form an LED group, thereby ensuring a higher light intensity.

However, although the LED illumination apparatuses have a long lifetime as described above, the LED illumination apparatuses have a finite life span of several ten thousand hours, and thus the LED lamps have to be replaced after all. In addition, because the LED lamps are configured by a plurality of LED elements connected in series to each other, if only one of the plurality of LED elements is disconnected/shorted, the LED lamps lose an illumination function, or the electric current flowing through the LED elements is increased, thereby shortening the life span.

To solve disconnection/short problems of the LED elements, JP-A-H06-291732 discloses an LED apparatus including a plurality of LED rows, each of which has a plurality of LED elements connected in series to each other and are connected in parallel to each other, and an electric current flowing through each LED group is detected by a detection resistor, so that a disconnection is detected based on decrease in voltage of the detection resistor.

Further, JP-A-2008-258428 discloses an LED illumination apparatus including an LED group having a plurality of LED rows connected in parallel to each other, in which a circuit open state is detected when an abnormality is occurred and thus any of LED rows are disconnected, so that an electric current of magnitude corresponding to LED rows having an abnormality is redistributed over LED rows other than the disconnected LED rows.

SUMMARY

However, although a method for detecting whether or not the LED rows are disconnected and also measures for suppressing reduction of light intensity are disclosed in the related art, there is no teaching with respect to replacement of the LED lamp.

Namely, it is not considered that, according to abnormality of the LED rows, the LED lamp is safely replaced with a normal LED lamp without stopping electricity supply to the LED illumination apparatus.

Accordingly, this disclosure provides at least an LED illumination system in which an LED lamp can be safely replaced and restored without stopping electricity supply to the LED illumination apparatus.

In view of the above, an LED illumination system of this disclosure comprises: a load including an LED lamp, which includes at least one of LED rows having a plurality of LED elements connected in series to each other, the LED rows being connected in parallel to each other; and a power supply device that supplies a direct current power to the load, the LED lamp configured to be physically mounted on and demounted from the power supply device, the power supply device comprising: a current feedback control unit having a detection resistor to detect an electric current flowing through the load, wherein the current feedback control unit is configured to compare a value of the electric current detected on the detection resistor with a predetermined reference value, thereby performing a constant current control; a first voltage comparison unit configured to determine whether the load is in a demounted state, according to a value of an output voltage of the power supply device; a voltage feedback control unit configured to decrease the voltage of the power supply device to a safe voltage when the load is demounted from a mounted state, and to increase the voltage of the power supply device to perform the constant current control when the load is mounted from the demounted state; and a semiconductor switch element connected in series between the load and the detection resistor, wherein the mounted and demounted states of the load is detected by a voltage of a main electrode of a high potential side of the semiconductor switch element.

According to the LED illumination system of this disclosure, an LED lamp can be safely replaced and restored without stopping electricity supply to the LED illumination system.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
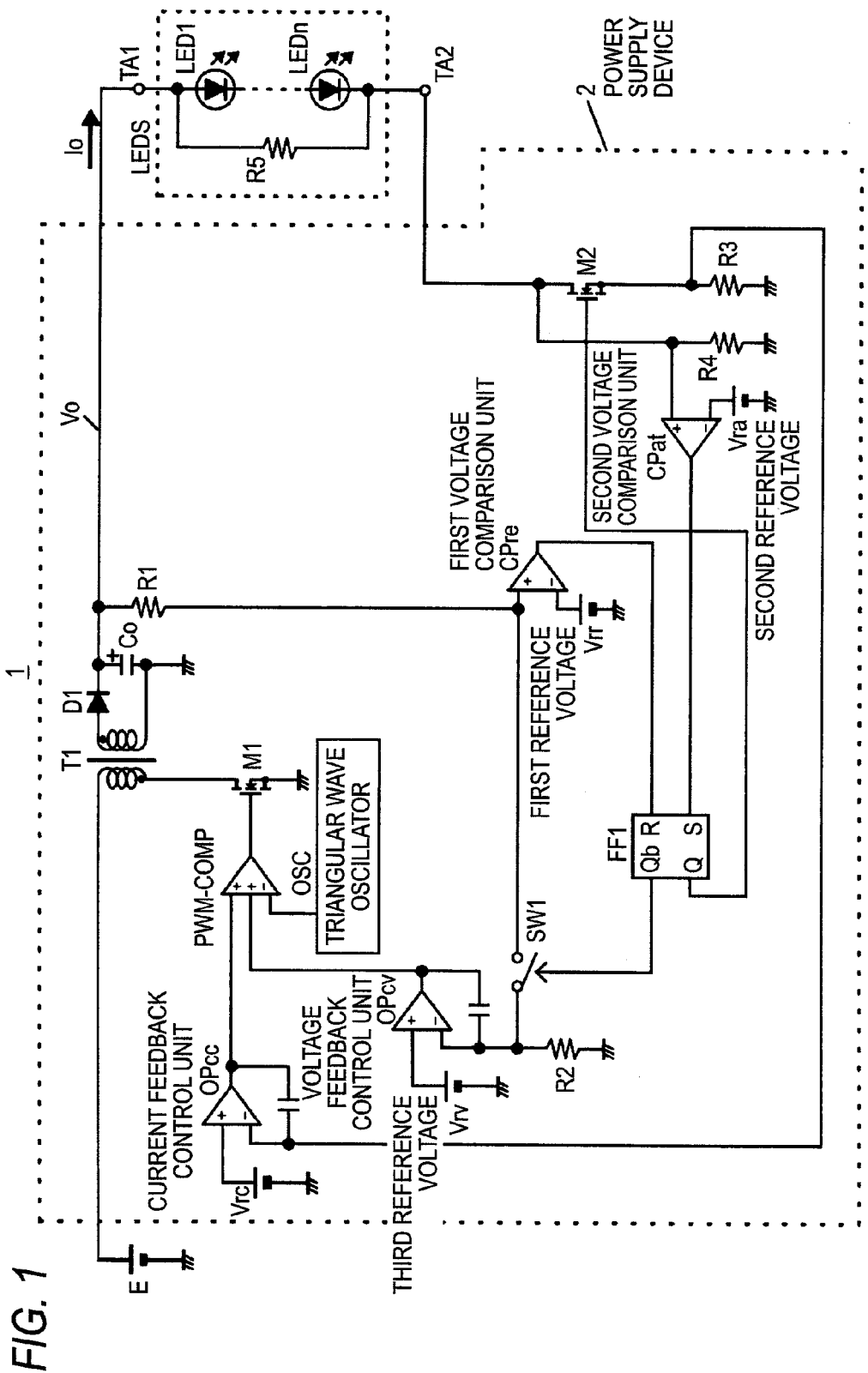
FIG. 1 is a configuration view illustrating an LED illumination apparatus according to a first aspect of this disclosure.

An LED illumination apparatus according to aspects of this disclosure will be now described with reference to the accompanying drawings. In the drawings, the same or similar components are designated by the same or similar reference numerals.

[First Aspect]

FIG. 1 is a configuration view illustrating an LED illumination apparatus according to a first aspect of this disclosure.

With reference to FIG. 1, the configuration of the LED illumination system 1 according to the present aspect will be described. The LED illumination system 1 includes a direct current power source E, a power supply device 2, and an LED lamps LEDS. A voltage of the direct current power source E is converted to a voltage driving the LED lamps LEDS by the power supply device 2, and then supplied to the LED lamps LEDS through terminals TA1 and TA2 of the power supply device 2. Although the power supply device 2 shown in FIG. 1 is configured as a fly-back type converter, the power supply device 2 may be configured as a step-up or step-down chopper type converter or the like, and the converter may also be substituted by other types.

The LED lamp LEDS includes terminals TA1 and TA2 and has a shape allowing for the LED lamp LEDS to be mounted and demounted as a unitary assembly on and from the power supply device 2.

Figure 7:
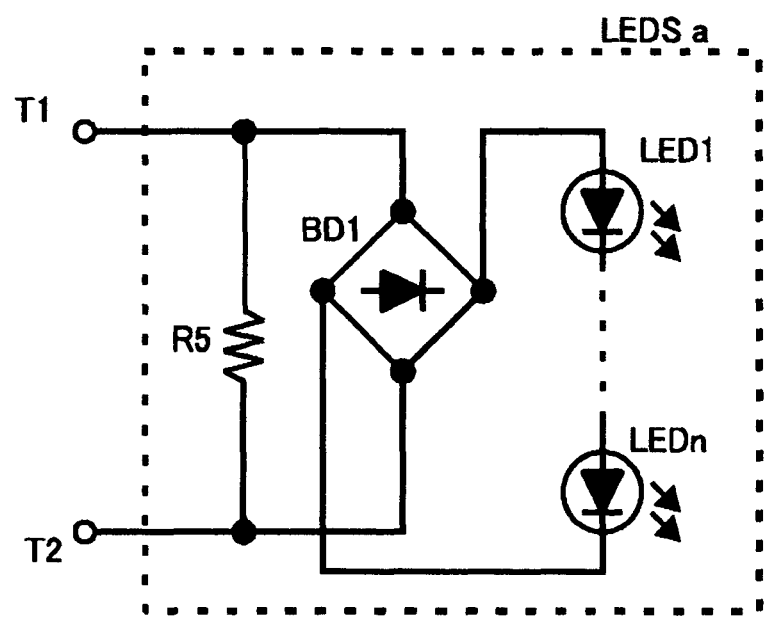
FIG. 7 is a circuit diagram illustrating a non-polarity LED lamp by which electricity can be received independently of polarity.

As shown in FIG. 1, the LED lamp LEDS receives electricity in a polarity manner, in which the terminal TA1 has a plus polarity and the terminal TA2 has a minus polarity. However, the LED lamp LEDS may be replaced with a non-polarity LED lamp LEDS as shown in FIG. 7.

The power supply device 2 shown in FIG. 1 is configured as a fly-back type DC/DC converter, and has a series circuit of a primary coil of a transformer T1 and a switching element M1 connected to the direct current power source E. A secondary circuit of the transformer T1 is connected to a series circuit of a diode D1 and a smoothing capacitor Co, and a voltage between both terminals of the smoothing capacitor Co become an output voltage outputted to the LED lamp LEDS.

Here, a negative electrode of the smoothing capacitor Co is connected to GND, and a positive electrode of the smoothing capacitor Co is connected to the terminal TA1. The terminal TA1 is connected to a positive electrode of the LED lamp LEDS, and a negative electrode of the LED lamp LEDS is connected to the terminal TA2. The terminal TA2 is connected to GND through a series circuit of a switching element M2 and a current detection resistor R3.

In addition to the components described above, the fly-back type DC/DC converter is configured by a comparator PWM-COMP, a triangular wave oscillator OSC, a current feedback control unit and a voltage feedback control unit, and additionally includes a first voltage comparison unit, a second voltage comparison unit, a flip-flop circuit FF1 and a switch SW1.

A gate of the switching element M1 of the fly-back type DC/DC converter is connected with an output of the comparator PWM-COMP configured to generate a switching pulse, which is a gate driving signal, and an inverting terminal of the comparator PWM-COMP is connected to the triangular wave oscillator OSC. One of non-inverting terminals of the comparator PWM-COMP is connected to an output terminal of an error amplifier OPcc, which becomes the current feedback control unit. The other of the non-inverting terminals is connected to an output terminal of an error amplifier OPcv, which becomes the voltage feedback control unit. Here, the comparator PWM-COMP determines a pulse width of the switching pulse by comparing a triangular wave voltage from the triangular wave oscillator OSC, which is connected to the inverting terminal, with a signal voltage from any one of the current feedback control unit and the voltage feedback control unit, which are connected to the non-inverting terminals.

A non-inverting terminal of the error amplifier OPcc is connected to a reference voltage Vrc, which becomes a reference value of an electric current flowing through the LED lamp, and an inverting terminal thereof is connected to a connection node between the current detection resistor R3 and the switching element M2.

Also, a non-inverting terminal of the error amplifier OPcv is connected to a reference voltage Vry and an inverting terminal thereof is connected to GND through a resistor R2 and also connected to one of terminals of the switch SW1. The other terminal of the switch SW1 is connected to the positive electrode of the smoothing capacitor Co through a resistor R1 and also connected to a non-inverting terminal of a voltage comparator CPre, which constitutes the first voltage comparison unit. An inverting terminal of the voltage comparator CPre is connected to a first reference voltage Vrr.

The second voltage comparison unit is configured by a voltage comparator CPat, a second reference voltage Vra and a resistor R4. An inverting terminal of the voltage comparator CPat is connected to the second reference voltage Vra, and a non-inverting terminal thereof is connected to one of terminals of the resistor R4 and a drain of the switching element M2. Also, the resistor R4 is connected in parallel to a series circuit of the switching element M2 and the current detection resistor R3, and the other terminal of the resistor R4 is grounded to GND.

A setting terminal of the flip-flop FF1 is connected with an output of the voltage comparator CPat of the second voltage comparison unit, and a reset terminal thereof is connected with an output of the voltage comparator CPre of the first voltage comparison unit. A Q output of the flip-flop FF1 is connected to a gate of the switching element M2 and a Qb (Q bar) output thereof is connected to a control terminal of the switch SW1.

The LED illumination system 1 as shown in FIG. 1 detects whether the LED lamp LEDS as a load is present or not, by the first voltage comparison unit and the second voltage comparison unit. In a state where the LED lamp LEDS is demounted, the first voltage comparison unit detects a demounted state and then resets the flip-flop FF1 and also turns the switch SW1 on, so that the voltage feedback control unit decreases an output voltage of the power supply device 2 to a safe voltage. As described above, the LED lamp LEDS is LED rows in which a plurality of LED elements are connected in series to each other, and thus a voltage of about 50 V to 100 V is typically required. Therefore, when the LED lamp LEDS is detached, a risk of electric shock has to be suppressed and thus the voltage is decreased to a safe voltage (DC 42 V or lower). The safe voltage can be set by a resistance ratio between the resistors R1 and R2 and the reference voltage Vrv.

Also, when the LED lamp LEDS as a load is mounted, the output voltage of the power supply device 2 is applied to the drain of the switching element M2 through a resistor R5 of the LED lamp LEDS. This is detected by the second voltage comparison unit and then the flip-flop FF1 is set. Accordingly, the switching element M2 is turned on and the switch SW1 is turned off, so that control by the voltage feedback control unit is switched to control by the current feedback control unit. In other words, the LED lamp LEDS is connected with the output of the power supply device 2 through the series circuit of the switching element M2 and the current detection resistor R3, and the power supply device 2 is controlled by the current feedback control unit so that an electric current flowing through the LED lamp LEDS becomes a constant current.

Figure 2:
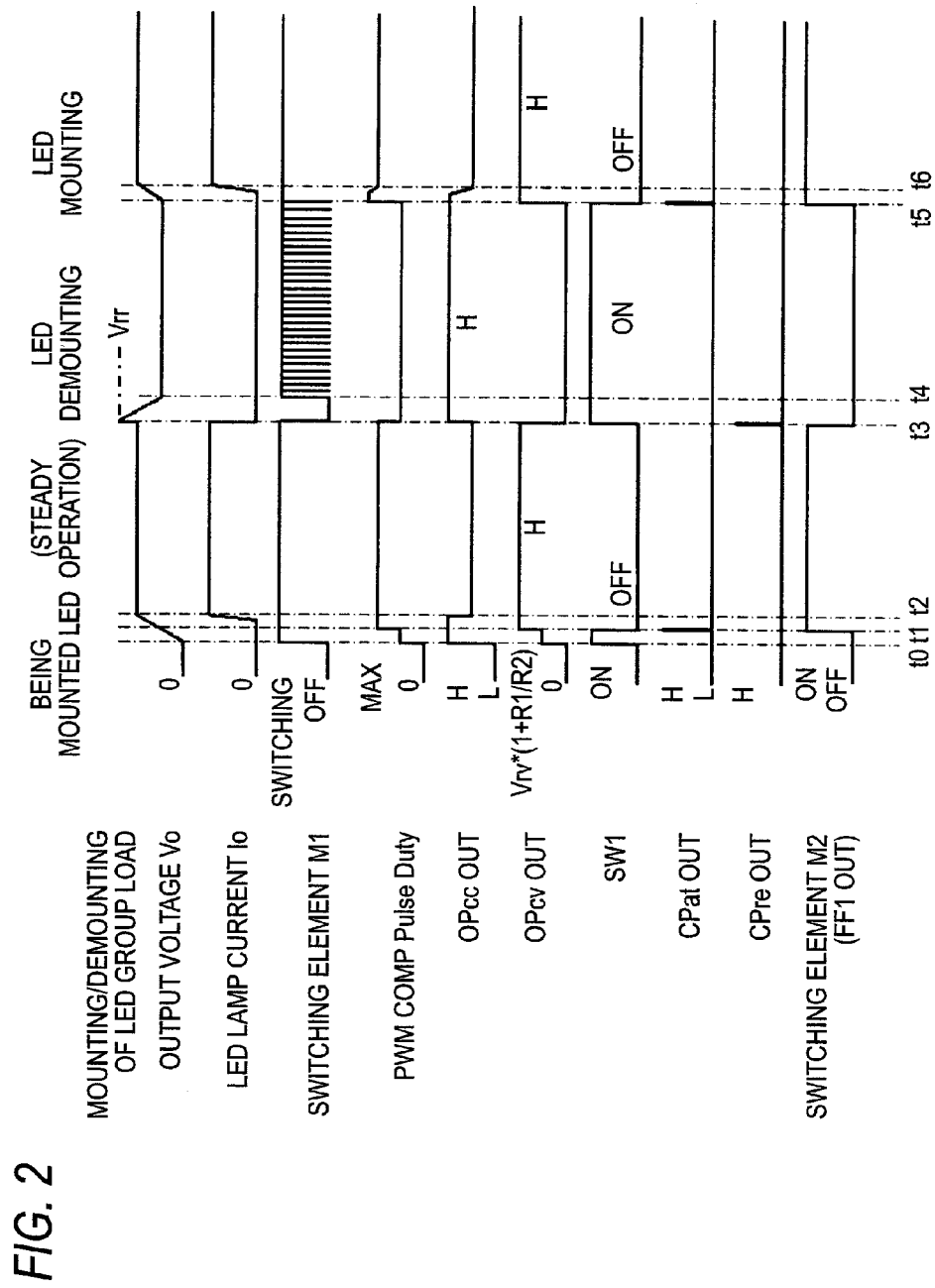
FIG. 2 is a sequence diagram illustrating an operation of each part when an LED lamp shown in FIG. 1 is mounted and demounted.
Figure 3:
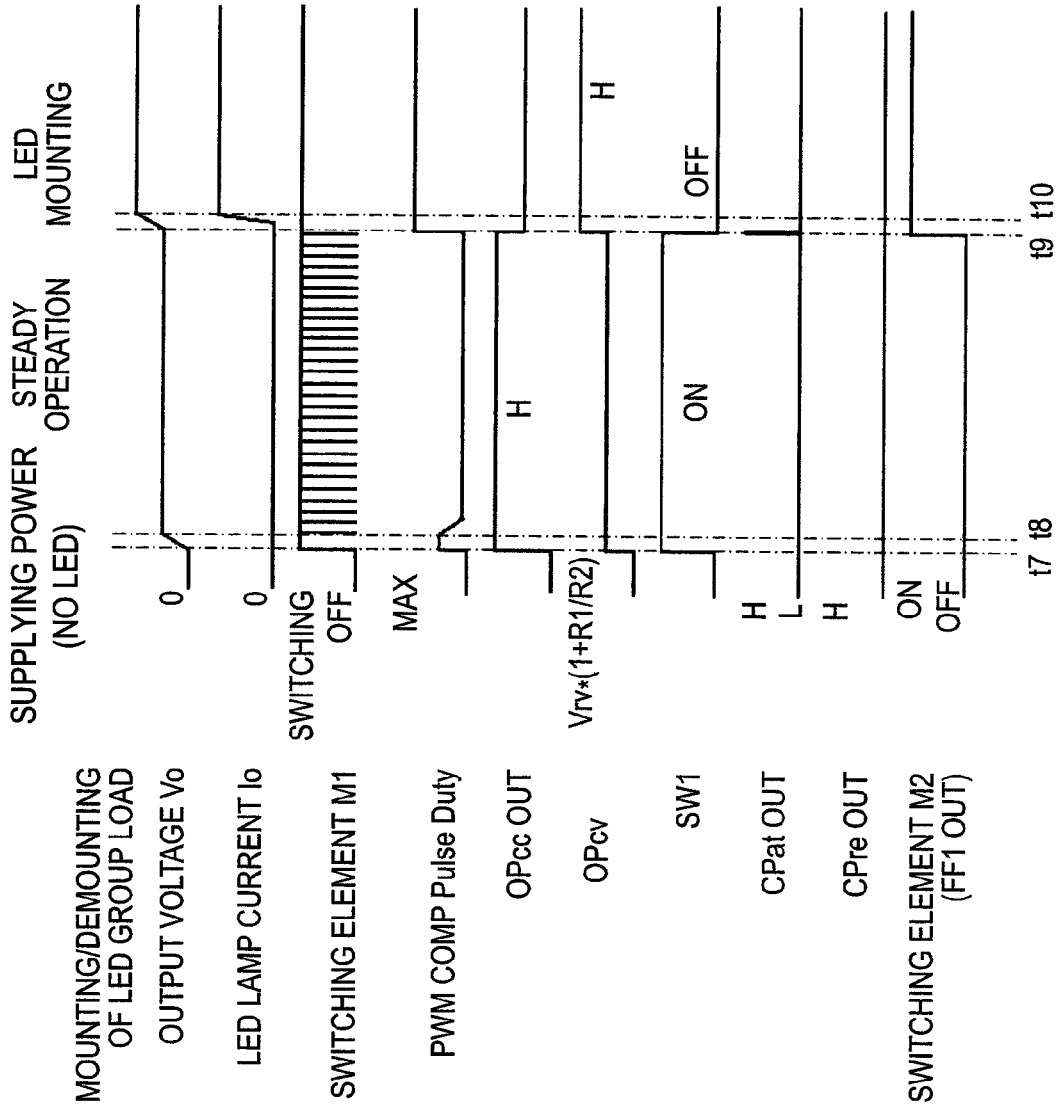
FIG. 3 is a sequence diagram illustrating an operation of each part until the LED lamp shown in FIG. 1 is mounted from a demounted state.

FIG. 2 is a sequence diagram illustrating an operation of each part when the LED lamp shown in FIG. 1 is mounted and demounted. Also, FIG. 3 is a sequence diagram illustrating an operation of each part from the demounted state of the LED lamp shown in FIG. 1 to mounting thereof.

Next, with reference to FIGS. 2 and 3, an operation of each part of the LED illumination system 1 according to the present aspect will be described.

During times t0 to t3 as shown in FIG. 2, the LED lamp LEDS is mounted on the power supply device 2. At the time t0, the direct current power source E supplies power to the power supply device 2 and switching of the switching element M1 is started, and thus the output voltage Vo starts to be increased.

When reaching the time t1, the non-inverting terminal of the comparator CPat of the second voltage detection unit, which is detecting a drain voltage of the switching element M2, exceeds the second reference voltage Vra, and thus an H-leveled output signal is inputted to the setting terminal of the flip-flop FF1. As a result, the flip-flop FF1 is set, and thus an H-signal is outputted from the Q output. This H-signal is applied to the gate of the switching element M2, thereby turning the switching element M2 on. Also, the Qb (Q bar) output is changed to an L-signal and as a result, the switch SW1 is turned from on to off. Thus, a partial voltage of the output voltage Vo due to the resistors R1 and R2, which has been inputted to the inverting terminal of the error amplifier OPcv of the voltage feedback control unit, is disconnected, and the inverting terminal of the error amplifier OPcv becomes a GND potential through the resistor R2. As a result, the output voltage of the error amplifier OPcv outputs an H-signal to the other non-inverting terminal of the comparator PWM-COMP, thereby stopping a function of the voltage feedback control unit of controlling the output voltage Vo.

Here, as the voltage feedback control unit is stopped, the output voltage Vo is further increased over the times t1 to t2 and then an electric current Io starts to flow in the LED lamp LEDS through the series circuit of the switching element M2 and the current detection resistor R3. At the time t2, when the electric current Io flowing through the LED lamp LEDS reaches the current reference value Vrc of the error amplifier OPcc of the current feedback control unit, the output voltage of the error amplifier OPcc is outputted to the one non-inverting terminal of the comparator PWM-COMP so that a voltage value dropped by the current detection resistor R3 is to be the same as a reference voltage corresponding to the current reference value Vrc. As a result, the electric current Io is controlled under a constant current control.

At the time t3, if the LED lamp LEDS as a load is demounted, the power supply device 2 becomes a no-load state and thus the output voltage Vo is suddenly increased. Therefore, when the output voltage Vo reaches the first reference voltage Vrr, an H-signal from the output of the comparator CPre of the first voltage comparison unit, which is detecting the output voltage Vo, is inputted to the reset terminal of the flip-flop FF1, thereby resetting the flip-flop FF1. As a result, the Qb output is inverted such that an H-signal is outputted to the control terminal of the switch SW1, thereby turning the switch SW1 on. Also, the Q output outputs an L-signal, thereby turning the switching element M2 off.

Therefore, a partial voltage of the output voltage Vo due to the resistors R1 and R2 is inputted to the inverting terminal of the error amplifier OPcv of the voltage feedback control unit, and thus a control for decreasing the output voltage Vo to a voltage value, which is obtained by multiplying the resistance ratio between the resistors R1 and R2 by the reference voltage Vrv, namely for decreasing the output voltage Vo to the safe voltage, is started. Then, the output voltage Vo reaches and keeps a stable voltage at a time t4.

Also, at the time t3, since the LED lamp LEDS is demounted, the electric current Io flowing through the current detection resistor R3 becomes zero, and thus the inverting terminal of the error amplifier OPcc of the current feedback control unit becomes the GND potential through the current detection resistor R3. Therefore, the output voltage of the error amplifier OPcc outputs an H-signal to the one non-inverting terminal of the comparator PWM-COMP, and thus a function of the current feedback control unit of controlling the output current Io is stopped. In other words, at the time t3, the output current Io control by the current feedback control unit is switched to the voltage control by the voltage feedback control unit.

At a time t5, if the LED lamp LEDS as a load is re-mounted, the drain voltage of the switching element M2 becomes a partial voltage of the output voltage Vo due to the resistor R5 and the resistor R4 and exceeds a value of the second reference voltage Vra. The non-inverting terminal of the comparator CPat of the second voltage detection unit, which is detecting the drain voltage of the switching element M2, exceeds the second reference voltage Vra, and thus an H-leveled output signal is inputted to the setting terminal of the flip-flop FF1. As a result, the flip-flop FF1 is set, and thus an H-signal is outputted from the Q output. This H-signal is applied to the gate of the switching element M2, thereby turning the switching element M2 on. Also, the Qb (Q bar) output is changed to an L-signal and thus the switch SW1 is turned from on to off. Thus, a partial voltage of the output voltage Vo due to the resistors R1 and R2, which has been inputted to the inverting terminal of the error amplifier OPcv of the voltage feedback control unit, is disconnected, and the inverting terminal of the error amplifier OPcv becomes the GND potential through the resistor R2. Then, the output voltage of the error amplifier OPcv outputs an H-signal to the other non-inverting terminal of the comparator PWM-COMP, thereby stopping a function of the output voltage Vo control the voltage feedback control unit. Thus, the output voltage Vo is increased, and the electric current Io starts to flow in the LED lamp LEDS through the series circuit of the switching element M2 and the current detection resistor R3.

At the time t6, when the electric current Io flowing through the LED lamp LEDS reaches the current reference value Vrc of the error amplifier OPcc of the current feedback control unit, the output voltage of the error amplifier OPcc is outputted to the one non-inverting terminal of the comparator PWM-COMP so that a voltage value dropped by the current detection resistor R3 is to be the same as a reference voltage corresponding to the current reference value Vrc. As a result, the electric current Io is controlled under a constant current control.

Next, FIG. 3 is a sequence diagram illustrating an operation of each part when the direct current power source E supplies power to the power supply device 2 in a state where the LED lamp is demounted, and the description thereof is given below.

At a time t7, when the direct current power source E supplies power to the power supply device 2, switching of the switching element M1 is started, and thus the output voltage Vo starts to be increased.

When reaching a time t8, because the LED lamp LEDS has not been connected to the terminals TA1 and TA2, the non-inverting terminal of the comparator CPat of the second voltage comparison unit is not applied with a voltage and thus becomes the GND potential through the resistor R4. Therefore, the flip-flop FF1 remains in a reset state, and then the switch SW1 keeps and an on-state and the switching element M2 keeps an off-state. Also, an inverting terminal voltage of the error amplifier OPcc of the current feedback control unit becomes the GND potential through the current detection resistor R3, and thus the function thereof is stopped. In this case, because the switch SW1 is on, the error amplifier OPcv of the voltage feedback control unit limits the output voltage Vo to the safe voltage.

Then, at a time t9, if the LED lamp LEDS as a load is mounted, the output voltage Vo is applied to the drain of the switching element M2 through the resistor R5 via the terminals TA1 and TA2. The drain voltage of the switching element M2 becomes a partial voltage of the output voltage Vo due to the resistor R5 and the resistor R4 and exceeds a value of the second reference voltage Vra. The non-inverting terminal of the comparator CPat of the second voltage detection unit, which is detecting the drain voltage of the switching element M2, exceeds the second reference voltage Vra, and thus an H-leveled output signal is inputted to the setting terminal of the flip-flop FF1. As a result, the flip-flop FF1 is set, and thus an H-signal is outputted from the Q output. This H-signal is applied to the gate of the switching element M2, thereby turning the switching element M2 on. Also, the Qb (Q bar) output is changed to an L-signal and as a result, the switch SW1 is turned from on to off. Thus, a partial voltage of the output voltage Vo due to the resistors R1 and R2, which has been inputted to the inverting terminal of the error amplifier OPcv of the voltage feedback control unit, is disconnected, and then the inverting terminal of the error amplifier OPcv becomes the GND potential through the resistor R2.

As a result, the output voltage of the error amplifier OPcv outputs an H-signal to the other non-inverting terminal of the comparator PWM-COMP, thereby stopping a function of the output voltage Vo control of the voltage feedback control unit. The output voltage Vo is increased, and then the electric current Io starts to flow in the LED lamp LEDS through the series circuit of the switching element M2 and the current detection resistor R3. Also, the electric current Io flowing through the LED lamp LEDS is controlled under a constant current control by the current feedback control unit.

As described above, according to the LED illumination system 1 according of the present aspect, a replacement operation, in which a failed LED lamp is demounted and then a normal LED lamp is mounted, is to be safely performed without stopping electricity supply to the LED illumination apparatus.

[Second Aspect]

Figure 4:
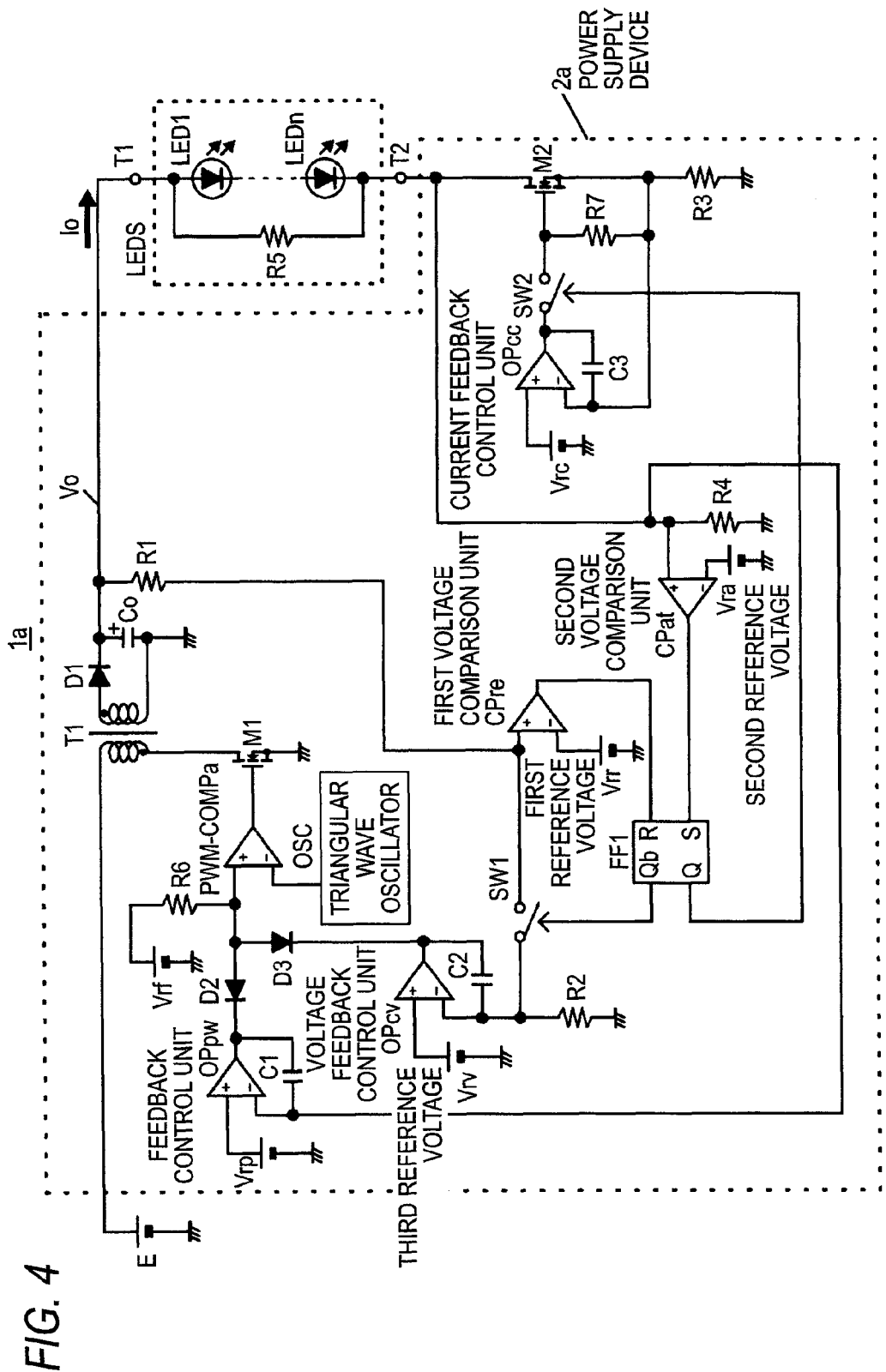
FIG. 4 is a configuration view illustrating an LED illumination apparatus according to a second aspect.

FIG. 4 is a configuration view illustrating an LED illumination apparatus according to a second aspect. In FIG. 4, the components similar to those in FIG. 1 are designated by the same reference numerals, and thus the description thereof is omitted.

The LED illumination system 1a according to the second aspect has a configuration, in which a dropper-type constant current control unit is incorporated into the switching operation of the switching element M2 of the first aspect. Namely, a voltage between main electrodes of the switching element M2 is not used as a saturated region, but is set to become an unsaturated region causing a dropper operation, and also an electric current flowing through the LED lamp LEDS is controlled under a constant current control based on a voltage detected by the current detection resistor R3 to become a constant current.

Meanwhile, a power feedback control unit is added instead of the current feedback control unit of the first aspect, so that the voltage between the main electrodes of the switching element M2 becomes a predetermined unsaturated voltage.

Also, a peripheral portion of a comparator PWM-COMPa of a power supply device 2a is similar to the peripheral portion of the comparator PWM-COMP of the first aspect, but it has a configuration changed to an application employing a general comparator (PWM-COMPa), in which the number of non-inverting terminals of the comparator PWM-COMP is changed from two to one.

Specifically, as shown in FIG. 4, a non-inverting terminal of the comparator PWM-COMPa is connected with anodes of diodes D2 and D3, and a cathode of the diode D3 is connected to the output of the error amplifier OPcv of the voltage feedback control unit. Also, a cathode of the diode D2 is connected to an output of an error amplifier OPpw of the power feedback control unit. This connection method is intended to control a non-inverting terminal voltage of the comparator PWM-COMPa by electric currents inputted from each error amplifier. A reference voltage Vrf as a bias source is connected to the non-inverting terminal of the comparator PWM-COMPa through a resistor R6.

Then, components of the second aspect different from those in FIG. 1 illustrating the configuration of the first aspect will be described in detail.

The dropper-type constant current control unit including the switching element M2 is configured by an error amplifier OPcc, a reference voltage Vrc, a switch SW2, a detection resistor R3, a resistor R7 and a capacitor C3. A non-inverting terminal of the error amplifier OPcc is connected to the reference voltage Vrc, and an inverting terminal thereof is connected to a connection node between a source of the switching element M2 and the detection resistor R3 and is also connected to one of terminals of the capacitor C3 and to one of terminals of the resistor R7. An output terminal of the error amplifier OPcc is connected to one of terminals of the switch SW2 and to the other terminal of the capacitor C3, and the other terminal of the switch SW2 is connected to a gate of the switching element M2 and the other terminal of the resistor R7.

Also, the Q output of the flip-flop FF1 is connected to a control terminal of the switch SW2. This is different in that, in FIG. 1, the Q output of the flip-flop FF1 is connected to the gate of the switching element M2.

The dropper-type constant current control unit including the switching element M2 detects an electric current Io of the LED lamp LEDS as a load on the detection resistor R3, compares the detected voltage with the reference voltage Vrc by the error amplifier OPcc, and then controls a gate voltage of the switching element M2 through the switch SW2 so that the detected voltage has the same voltage value as that of the reference voltage Vrc. However, the condition causing a constant current operation to be performed requires that the Q output of the flip-flop FF1 is an H-level and the switch SW2 is on.

The power feedback control unit is configured by an error amplifier OPpw, a reference voltage Vrp, a capacitor C1 and the diode D2. A non-inverting terminal of the error amplifier OPpw is connected to the reference voltage Vrp, and an inverting terminal thereof is connected to a drain of the switching element M2, a non-inverting terminal of a comparator CPat of a second voltage comparison unit and one of terminals of a resistor R4. An output terminal of the error amplifier OPpw is connected to the non-inverting terminal of the comparator PWM-COMPa through the diode 2 as described above, and also the capacitor C1 is connected between the output terminal and the inverting terminal of the error OPpw.

A operation of the power feedback control unit is similar to the current feedback control unit shown in FIG. 1, but it is different in that, in FIG. 1, the electric current Io is controlled to eliminate an error between the value detected on the resistor R3 and the reference voltage Vrc in FIG. 1, whereas, in FIG. 4, the output voltage of the power supply device 2a is controlled to eliminate an error between a drain voltage of the switching element M2 and the reference voltage Vrp.

Figure 5:
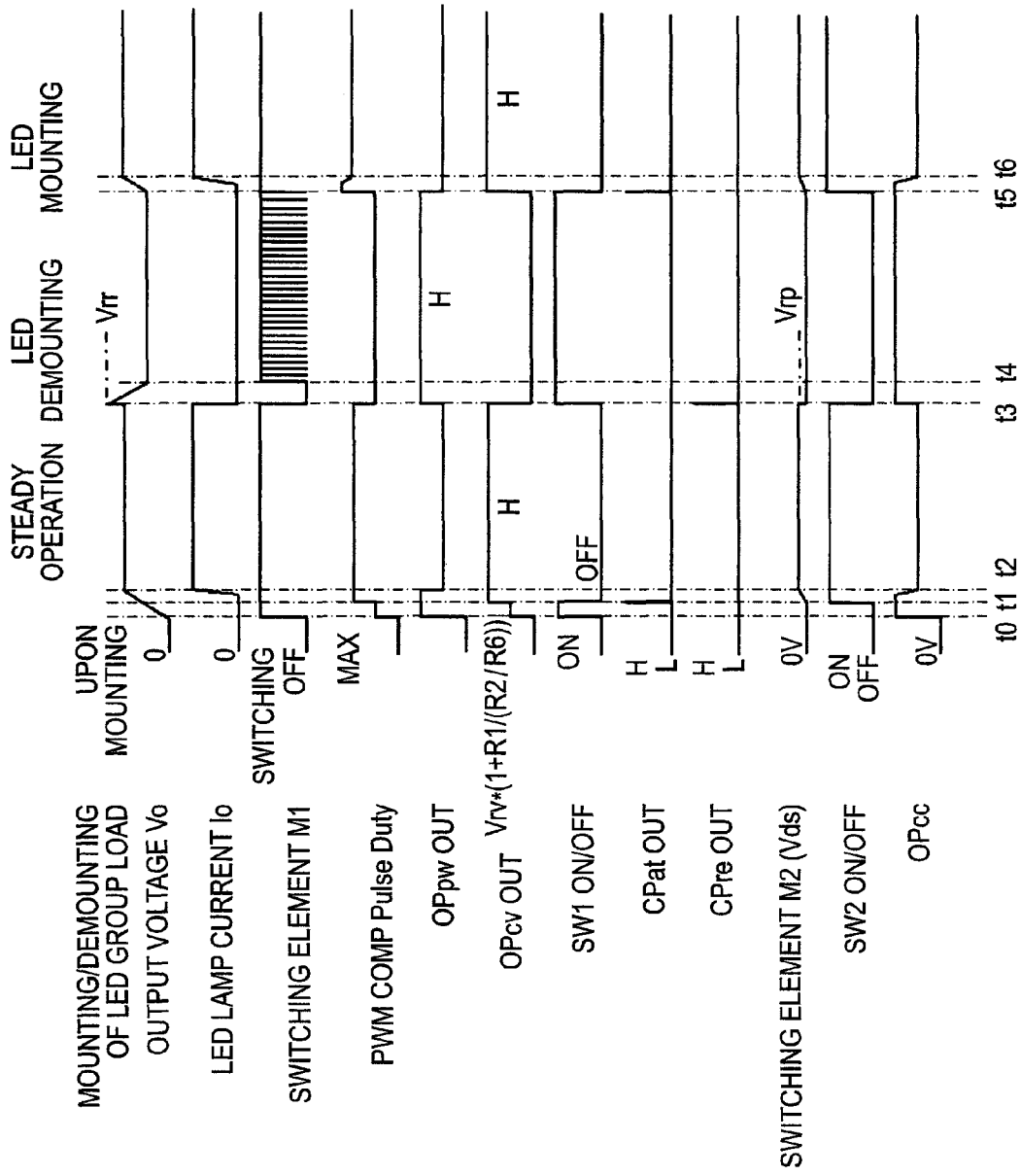
FIG. 5 is a sequence diagram illustrating an operation of each part when an LED lamp shown in FIG. 4 is mounted and demounted.
Figure 6:
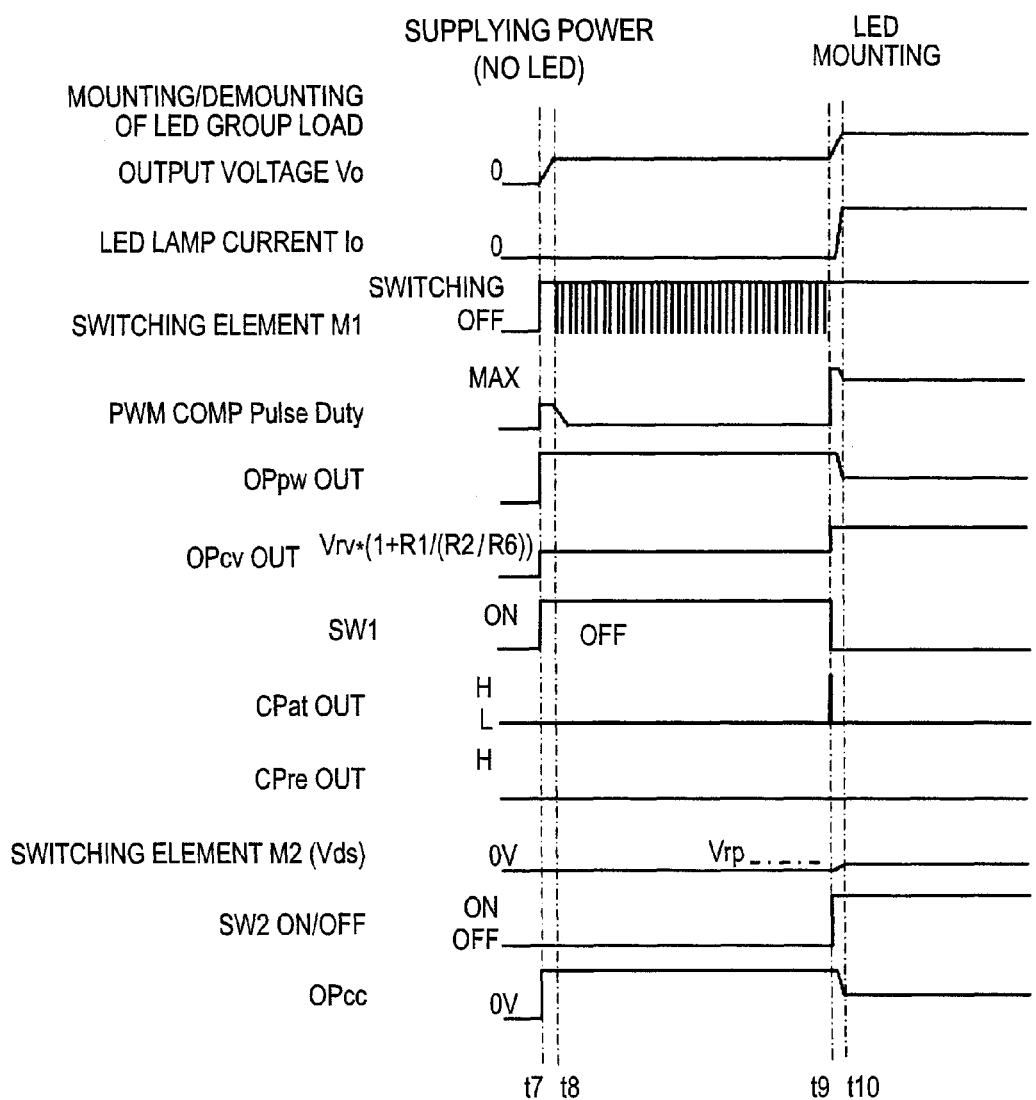
FIG. 6 is a sequence diagram illustrating an operation of each part from a demounted state of the LED lamp shown in FIG. 4.

FIG. 5 is a sequence diagram illustrating an operation of each part when the LED lamp shown in FIG. 4 is mounted and demounted. Also, FIG. 6 is a sequence diagram illustrating an operation of each part from a demounted state of the LED lamp shown in FIG. 4.

Next, with reference to FIGS. 5 and 6, an operation of each part of the LED illumination system 1a according to the second aspect will be described.

During times t0 to t3 as shown in FIG. 5, the LED lamp LEDS is mounted on the power supply device 2a. At the time t0, the direct current power source E supplies to the power supply device 2a, and switching of the switching element M1 is started, and thus the output voltage Vo starts to be increased. When reaching the time t1, the non-inverting terminal of the comparator CPat of the second voltage detection unit, which is detecting the drain voltage of the switching element M2, exceeds the second reference voltage Vra, and thus an H-leveled output signal is inputted to the setting terminal of the flip-flop FF1. As a result, the flip-flop FF1 is set, and thus an H-signal is outputted from the Q output. This H-signal is applied to the control terminal of the switch SW2, thereby turning the switch SW2 on. Therefore, although the constant current control unit becomes an operating state, the output voltage Vo does not reach a voltage causing an electric current to flow to the LED lamp LEDS, and thus the electric current Io does not yet flow at the time t1.

Also, the Qb (Q bar) output is changed to an L-signal, and thus the switch SW1 is turned from on to off. Thus, a partial voltage of the output voltage Vo due to the resistors R1 and R2, which has been inputted to the inverting terminal of the error amplifier OPcv of the voltage feedback control unit, is disconnected and the inverting terminal of the error amplifier OPcv becomes a GND potential through the resistor R2. As a result, the output voltage of the error amplifier OPcv outputs an H-signal to the cathode of the diode D3, thereby stopping a function of the voltage feedback control unit of controlling the output voltage Vo.

Here, as the voltage feedback control unit is stopped, the output voltage Vo is further increased over the times t1 to t2, and the electric current Io starts to flow in the LED lamp LEDS through the series circuit of the switching element M2 and the detection resistor R3. At the time t2, when the electric current Io flowing through the LED lamp LEDS reaches the current reference value Vrc of the error amplifier OPcc of the constant current control unit, the error amplifier OPcc controls the gate voltage of the switching element M2 through the switch SW2 so that a voltage value dropped by the detection resistor R3 is to be the same as a reference voltage corresponding to the current reference value Vrc. In addition, immediately after the time t2, the power feedback control unit controls the non-inverting terminal voltage of the comparator PWM-COMPa so that the drain voltage of the switching element M2 has a value similar to that of the reference voltage Vrp, thereby controlling the output voltage Vo of the power supply device 2a.

At the time t3, if the LED lamp LEDS as a load is demounted, the power supply device 2a becomes a no-load state, and thus the output voltage Vo is suddenly increased. In this case, when the output voltage Vo reaches the first reference voltage Vrr, an H-signal from the output of the comparator CPre of the first voltage comparison unit, which is detecting the output voltage Vo, is inputted to the reset terminal of the flip-flop FF1, thereby resetting the flip-flop FF1.

As a result, the Qb output is inverted such that an H-signal is outputted to the control terminal of the switch SW1, thereby turning the switch SW1 on. Also, the Q output outputs an L-signal, thereby turning the switch SW2 off. Therefore, a partial voltage of the output voltage Vo due to the resistors R1 and R2 is inputted to the inverting terminal of the error amplifier OPcv of the voltage feedback controller, and thus a control for decreasing the output voltage Vo to a voltage value, which is obtained by multiplying the resistance ratio between the resistors R1 and R2 by the reference voltage Vrv, namely for decreasing the output voltage Vo to the safe voltage, is started. Then, the output voltage Vo reaches and keeps a stable voltage at a time t4.

In addition, at the time t3, because the switch SW2 is turned off, the switching element M2 is also turned off and thus a function of the output current Io control of the constant current control unit is stopped. Also, as the switching element M2 is turned off, an inverting terminal voltage of the power feedback control unit becomes the GND potential through the resistor R4, and thus the output voltage of the error amplifier OPpw outputs an H-signal to the cathode of the diode D2. As a result, at the time t3, the PWM control of the power supply device 2a is switched from the control by the power feedback control unit to the voltage control by the voltage feedback control unit.

At a time t5, if the LED lamp LEDS as a load is re-mounted, the drain voltage of the switching element M2 becomes a partial voltage of the output voltage Vo due to the resistor R5 and the resistor R4 and exceeds a value of the second reference voltage Vra. The non-inverting terminal of the comparator CPat of the second voltage detection unit, which is detecting the drain voltage of the switching element M2, exceeds the second reference voltage Vra, and thus an H-leveled output signal is inputted to the setting terminal of the flip-flop FF1. As a result, the flip-flop FF1 is set, and thus an H-signal is outputted from the Q output. This H-signal is applied to the control terminal of the switch SW2, thereby turning the constant current control unit and the switching element M2 on. Also, the Qb (Q bar) output is changed to an L-signal and as a result, the switch SW1 is turned from on to off. Thus, a partial voltage of the output voltage Vo due to the resistors R1 and R2, which has been inputted to the inverting terminal of the error amplifier OPcv of the voltage feedback control unit, is disconnected and the inverting terminal of the error amplifier OPcv becomes the GND potential through the resistor R2. As a result, the output voltage of the error amplifier OPcv outputs an H-signal to the cathode of the diode D3, thereby stopping a function of the voltage feedback control unit of controlling the output voltage Vo. The output voltage Vo is increased and the electric current Io starts to flow in the LED lamp LEDS through the series circuit of the switching element M2 and the current detection resistor R3.

At the time t6, when the electric current Io flowing through the LED lamp LEDS reaches the current reference value Vrc of the error amplifier OPcc of the constant current control unit, the output of the error amplifier OPcc controls the gate voltage of the switching element M2 through the switch SW2 so that a voltage value dropped by the detection resistor R3 is to be the same as a reference voltage corresponding to the current reference value Vrc, and as a result, the electric current Io flowing through the LED lamp LEDS is controlled under a constant current control. In addition, similarly to those immediately after the time t2, the power feedback control unit controls the non-inverting terminal voltage of the comparator PWM-COMPa so that the drain voltage of the switching element M2 has a value similar to that of the reference voltage Vrp, thereby controlling the output voltage Vo of the power supply device 2a.

Next, FIG. 6 is a sequence diagram illustrating an operation of each part when the direct current power source E supplies power to the power supply device 2a in a state where the LED lamp is demounted, and the description thereof is given below.

At a time t7, when the direct current power source E supplies power to the power supply device 2a, switching of the switching element M1 is started, and thus the output voltage Vo starts to be increased.

When reaching a time t8, because the LED lamp LEDS has not been connected to the terminals TA1 and TA2, the non-inverting terminal of the comparator CPat of the second voltage comparison unit is not applied with a voltage and thus becomes the GND potential through the resistor R4. Therefore, the flip-flop FF1 remains in a reset state, and the switch SW1 keeps an on state and the switch SW2 and the switching element M2 keeps an off-state. Also, the inverting terminal voltage of the error amplifier OPpw of the power feedback control unit becomes the GND potential through the detection resistor R4, and thus the function thereof is stopped. In this case, because the switch SW1 is on, the error amplifier OPcv of the voltage feedback control unit limits the output voltage Vo to the safe voltage.

Then, at a time t9, if the LED lamp LEDS as a load is mounted, the output voltage Vo is applied to the drain of the switching element M2 through the terminals TA1 and TA2, i.e., the resistor R5. The drain voltage of the switching element M2 becomes a partial voltage of the output voltage Vo due to the resistor R5 and the resistor R4 and exceeds a value of the second reference voltage Vra. The non-inverting terminal of the comparator CPat of the second voltage detection unit, which is detecting the drain voltage of the switching element M2, exceeds the second reference voltage Vra, and thus an H-leveled output signal is inputted to the setting terminal of the flip-flop FF1. As a result, the flip-flop FF1 is set, and thus an H-signal is outputted from the Q output and the switch SW2 is turned on. Also, the constant current control unit starts to be operated and the switching element M2 is turned on.

Also, the Qb (Q bar) output is changed to an L-signal and as a result, the switch SW1 is turned from on to off. Thus, a partial voltage of the output voltage Vo due to the resistors R1 and R2, which has been inputted to the inverting terminal of the error amplifier OPcv of the voltage feedback control unit, is disconnected and the inverting terminal of the error amplifier OPcv becomes the GND potential through the resistor R2. As a result, the output voltage of the error amplifier OPcv outputs an H-signal to the cathode of the diode D3, thereby stopping a function of the voltage feedback control unit of controlling the output voltage Vo. The output voltage Vo is further increased, and the electric current Io starts to flow in the LED lamp LEDS through the series circuit of the switching element M2 and the detection resistor R3. At a time t10, the electric current Io flowing through the LED lamp LEDS is controlled under a constant current control by the constant current control unit. In addition, immediately after the time t10, the voltage feedback control unit also starts to be operated, and thus the power supply device 2a is controlled by the voltage feedback control unit.

As described above, similarly to the first aspect, the LED illumination system 1a according to the second aspect allows a replacement operation, in which a failed LED lamp is demounted and then a normal LED lamp is mounted, to be safely performed without stopping electricity supply to the LED illumination apparatus.

In the foregoing, although examples of aspects of this disclosure has been described, this disclosure is not limited to the above specific aspects, and accordingly, various changes and modifications thereof may be made within the scope of this disclosure as defined by the appending claims. For example, although the power supply device has been described using the fly-back type DC/DC converter, the converter may be changed to a forward type, or a step-up or step-down chopper-type.

In addition, the LED lamp LEDS as a load may be appropriately changed to an LED lamp LEDSa shown in FIG. 7, by which electricity can be received independently of polarity.

What is claimed is:

1. An LED illumination system comprising
a load including an LED lamp, the LED lamp including at least one LED row having a plurality of LED elements connected in series to each other, the at least one LED row being connected in parallel to each other; and
a power supply device configured to supply a direct current power to the load, the LED lamp configured to be physically mounted on and demounted from the power supply device,
the power supply device comprising:
a current feedback control unit having a detection resistor to detect an electric current flowing through the load, wherein the current feedback control unit is configured to compare a value of the electric current detected on the detection resistor with a predetermined reference value, thereby performing a constant current control;
a first voltage comparison unit configured to determine whether the load is in a demounted state, according to a value of an output voltage of the power supply device;
a voltage feedback control unit configured to decrease the voltage of the power supply device to a safe voltage when the load is demounted from a mounted state, and to increase the voltage of the power supply device to perform the constant current control when the load is mounted from the demounted state; and
a semiconductor switch element connected in series between the load and the detection resistor,
wherein the mounted and demounted states of the load is detected by a voltage of a main electrode of a high potential side of the semiconductor switch element.

2. The LED illumination system according to claim 1,
wherein the first voltage comparison unit detects the output voltage of the power supply device and compares the detected output voltage with a first reference voltage value, thereby outputting a signal,
wherein the power supply device further comprises:
a second voltage comparison unit configured to compare the voltage of the main electrode of the high potential side of the semiconductor switch element with a second reference voltage value, thereby outputting a signal; and
a logic circuit configured to be set by the signal of the second voltage comparison unit and to be reset by the signal of the first voltage comparison unit;

wherein the logic circuit turns the semiconductor switch element on while being set and turns the semiconductor switch element off while being reset, and wherein the logic circuit outputs a signal to decrease the output voltage of the power supply device to the safe voltage, to the voltage feedback control unit.

3. An LED illumination system comprising a load including an LED lamp, the LED lamp including at least one LED row having a plurality of LED elements connected in series to each other, the at least one LED row being connected in parallel to each other and a power supply device that supplies a direct current power to the load, the LED lamp configured to be physically mounted on and demounted from the power supply device, the power supply device comprising:

a detection resistor to detect an electric current flowing through the load;

a semiconductor element connected in series between the load and the detection resistor;

a current feedback control unit configured to compare a value of the electric current detected on the detection resistor with a predetermined reference value and to control a control terminal of the semiconductor element based on an error signal obtained by the comparison, thereby controlling the electric current flowing through the load under a constant current control;

a power feedback control unit configured to detect a voltage of a main electrode of the high potential side of the semiconductor element, to compare the detected voltage value of the main electrode of the high potential side with a predetermined reference voltage, thereby controlling the voltage of the main electrode of the high potential side of the semiconductor element under a constant voltage control based on an error signal obtained by the comparison;

a first voltage comparison unit configured to determine whether the load is in a demounted state, by comparing a value of an output voltage of the power supply device with a first reference voltage value, and then to transmit a demounting signal when the load is demounted; and a voltage feedback controller configured to decrease the voltage of the power supply device to a safe voltage, based on the demounting signal from the first voltage comparison unit.

4. The LED illumination system according to claim 3, wherein the power supply device further comprises:

a second voltage comparison unit configured to detect the voltage of the main electrode of the high potential side of the semiconductor element and to compare the detected voltage value of the main electrode of the high potential side with a second reference voltage value, thereby outputting a signal; and a logic circuit configured to be set by the signal of the second voltage comparison unit and to be reset by the demounting signal from the first voltage comparison unit;

wherein the logic circuit turns the semiconductor element on while being set and turns the semiconductor element off while being reset, and wherein the logic circuit outputs a signal to decrease the output voltage of the power supply device to the safe voltage, to the voltage feedback controller.

5. The LED illumination system according to claim 4, wherein, when the load is mounted from the demounted state and the logic circuit is then switched from a reset state to a set state, the voltage feedback control unit increases the output voltage of the power supply device so that the electric current flowing the load can be controlled under a constant current control.

6. The LED illumination system according to claim 1, wherein the load has a resistor connected in parallel to the at least one LED row.

\* \* \* \* \*